(12) United States Patent
Yun et al.

(10) Patent No.: US 9,280,703 B2
(45) Date of Patent: Mar. 8, 2016

(54) APPARATUS AND METHOD FOR TRACKING HAND

(75) Inventors: Woo Han Yun, Daejeon (KR); Jae Yeon Lee, Daejeon (KR); Do Hyung Kim, Daejeon (KR); Jae Hong Kim, Daejeon (KR); Joo Chan Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 590 days.

(21) Appl. No.: 13/596,523

(22) Filed: Aug. 28, 2012

(65) Prior Publication Data

US 2013/0177204 A1    Jul. 11, 2013

(30) Foreign Application Priority Data

Jan. 11, 2012    (KR) .......................... 10-2012-0003288

(51) Int. Cl.
G06K 9/00    (2006.01)

(52) U.S. Cl.
CPC .................................. G06K 9/00355 (2013.01)

(58) Field of Classification Search
None
See application file for complete search history.

(56) References Cited

U.S. PATENT DOCUMENTS

| 6,256,400 | B1 * | 7/2001 | Takata et al. ................... 382/103 |
| 6,731,778 | B1 * | 5/2004 | Oda et al. ....................... 382/118 |
| 8,194,921 | B2 * | 6/2012 | Kongqiao et al. .............. 382/103 |
| 2002/0041327 | A1 * | 4/2002 | Hildreth ................ G06T 19/006 348/42 |
| 2009/0324008 | A1 * | 12/2009 | Kongqiao et al. ............. 382/103 |
| 2011/0211754 | A1 | 9/2011 | Litvak et al. |

* cited by examiner

Primary Examiner — Stephen R Koziol
Assistant Examiner — Amandeep Saini
(74) Attorney, Agent, or Firm — Nelson Mullins Riley & Scarborough LLP; Anthony A. Laurentano; Michael Malone (57) ABSTRACT

Disclosed are an apparatus for tracking a location of a hand, includes: a skin color image detector for detecting a skin color region from an image input from an image device using a predetermined skin color of a user; a face tracker for tracking a face using the detected skin color image; a motion detector for setting a ROI using location information of the tracked face, and detecting a motion image from the set ROI; a candidate region extractor for extracting a candidate region with respect to a hand of the user using the skin color image detected by the skin color image detector and the motion image detected by the motion detector; and a hand tracker for tracking a location of the hand in the extracted candidate region to find out a final location of the hand.

18 Claims, 9 Drawing Sheets

IMAGE GENERATED BY
IMAGE COMBINING UNIT

FIG. 7B

LOCATION OF ELBOW

APPLIED EXAMPLE BY
DISTORTION FILTER

APPARATUS AND METHOD FOR TRACKING HAND

CROSS-REFERENCE TO RELATED APPLICATIONS

This application claims priority to and the benefit of Korean Patent Application No. 10-2012-0003288 filed in the Korean Intellectual Property Office on Jan. 11, 2012, the entire contents of which are incorporated herein by reference.

TECHNICAL FIELD

The present invention relates to a method for remotely tracking a human hand using image information obtained from two cameras, and more particularly, to a method for rapidly tracking a human hand present at a long distance to extract a location of the hand and distance information.

BACKGROUND ART

A technology of tracking a human hand is a core technology in which development is needed in order to be used in various fields such as a future user interface through gesture recognition, interaction with an intelligent robot, and an interface for entertainment. Various methods in which an operation is possible at a short distance into the technology of tracking the hand have conventionally been studied. However, there is a need for an additional development in terms of a long distance and rapid response speed. As a method of obtaining distance information, a method using a stereo image by means of a depth camera or two cameras has been used. However, in a case of the depth camera, there is a problem of requiring an additional expensive device. In a case of the stereo image, there is a problem with respect to processing speed.

The present invention suggests an actual usable method for tracking a hand that may obtain distance information using two cameras while increasing the performance of two options (long distance and rapid response speed).

SUMMARY OF THE INVENTION

The present invention has been made in an effort to provide an actual usable method for tracking a hand that may obtain distance information using at least two cameras while increasing the performance of a distance and response speed.

The present invention further provides a method for stably tracking a hand of a user included in an image input from an image device at rapid response speed.

An exemplary embodiment of the present invention provides an apparatus for tracking a hand, the apparatus including: a skin color image detector for detecting a skin color image from an image input from an image device using a predetermined skin color of a user; a face tracker for tracking a face using the skin color image detected by the skin color image detector; a motion detector for setting a region of interest (ROI) using location information of the face tracked by the face tracker, and detecting a motion image from the set ROI; a candidate region extractor for extracting a candidate region with respect to the hand of the user using the skin color image detected by the skin color image detector and the motion image detected by the motion detector; and a hand tracker for tracking a location of the hand extracted by the candidate region extractor to find out a location of the hand.

The skin color image detector may include: a histogram model generating unit for receiving an initial face location to generate a histogram model with respect to the image using the skin color of the face; and a skin color image generating unit for applying a histogram back-projection method based on the histogram model generated by the histogram model generating unit to generate the skin color image.

The face tracker may track a location of the face with respect to the skin color image using a mean shift tracking method when tracking the face.

The motion detector may include: a region of interest (ROI) setting unit for setting an ROI using the location of the face tracked by the face tracker; and a motion image generating unit for detecting a motion image using a frame difference between input images with respect to the set ROI.

The ROI setting unit may set a region which the hand is able to reach based on the location of a face of the user as the ROI.

The motion image detected by the motion image detecting unit may be detected using motion history information generated by accumulating a frame difference between a current image and a previous image continuously input N times.

Frame differences between the continuously input images may be accumulated N times by logically ORing the frame differences of the images.

The candidate region extractor may include: an image combining unit for generating a common region between the skin color image generated by the skin color image detector and motion images detected by the motion detector; and a candidate hand region detecting unit for applying a first preset algorithm to the common region generated by the image combining unit to obtain the candidate hand region.

The candidate hand region detecting unit may further include an elbow location estimator for estimating a location of an elbow using a ratio determined in consideration of location and size information of the face tracked by the face tracker, and applies a first preset algorithm based on the estimated location of the elbow to obtain the candidate hand region.

The hand tracker may apply a mean shift tracking method to a candidate region extracted by the candidate region extractor to find out the final location of the hand.

The apparatus may further include a distance calculator for applying a second preset algorithm to location information of the hand extracted by the hand extractor to calculate actual distance information of the hand.

The distance calculator may apply the second algorithm to a location of a first hand tracked from the first image input from a first image device and a location of a second hand tracked from the second image input from a second image device to calculate the actual distance information of the hand, and each of the location of the first hand and the location of the second hand may be a location of the hand tracked by the hand tracker.

Another exemplary embodiment provides a method for tracking a hand, the method including: detecting a skin color image from an image input from an image device using a predetermined skin color of a user; tracking a face using the skin color image detected in the detecting of the skin color image; setting a region of interest (ROI) using location information of the face tracked in the tracking of the face, and detecting a motion image from the set ROI; extracting a candidate region with respect to a hand of the user using the skin color image detected in the detecting of the skin color image and the motion image detected in the detecting of the motion image; and tracking a location of the hand in the candidate region extracted in the extracting of the candidate region to find out a final location of the hand.

The detecting of the skin color image may include receiving an initial face location to generate a histogram model with respect to the image using the skin color of the face; and applying a histogram back-projection method based on the histogram model generated in the generating of the histogram model to generate the skin color image.

The detecting of the motion image may include: setting the ROI using the location of the face tracked in the tracking of the face; detecting a motion image using a frame difference between input images with respect to the set ROI.

The extracting of the candidate region may include: generating a common region between the skin color image generated in the detecting of the skin color image and motion images detected in the detecting of the motion image; and applying a first preset algorithm to the common region generated in the generating of the common region in the generating of the common region to obtain the candidate hand region.

The detecting of the candidate hand region may further include estimating a location of an elbow using a ratio determined in consideration of location and size information of the face tracked in the tracking of the face, and the candidate hand region may be obtained by applying the first preset algorithm based on the estimated location of the elbow.

The method may further include applying a second preset algorithm to location information of the hand extracted in the tracking the location of the hand in the tracking of the hand to calculate actual distance information of the hand.

The calculating of the actual location information of the hand may include applying the second algorithm to a location of a first hand tracked from the first image input from a first image device and location information of a second hand tracked from the second image input from a second image device to calculate the actual distance information of the hand, and each of the location of the first hand and the location of the second hand may a location of the hand tracked in the tracking of the location of the hand.

Yet another exemplary embodiment provides a computer readable recording medium in which the method for tracking a hand is executed in a computer, including: detecting a skin color region from an image input from an image device using a predetermined skin color of a user; tracking a face using the skin color image detected in the detecting of the skin color image; setting a region of interest (ROI) using location information of the face tracked in the tracing of the face, and detecting a motion image from the set ROI; extracting a candidate region with respect to a hand of the user using the skin color image detected in the detecting of the skin color image and the motion image detected in the detecting of the motion image; and tracking a location of the hand in the candidate region extracted in the extracting of the candidate region to find out a final location of the hand: and applying a second preset algorithm to location information of the hand extracted in the tracking of the location of the hand to calculate actual distance information of the hand.

According to exemplary embodiments of the present invention, it is possible to stably track a location of a hand present in a remote location at rapid response speed using two cameras and accordingly to calculate an actual distance of the hand. According to the present invention, it is possible to recognize a gesture of a human over a long distance. Such recognition of the gesture of a human is expected to be used in various fields such as an intelligent robot field, security and monitoring fields, a smart environment, and a remote user interface.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings to avoid repletion. In describing the present invention, well-known functions or constructions will not be described in detail since they may unnecessarily obscure the understanding of the present invention.

Figure 1:
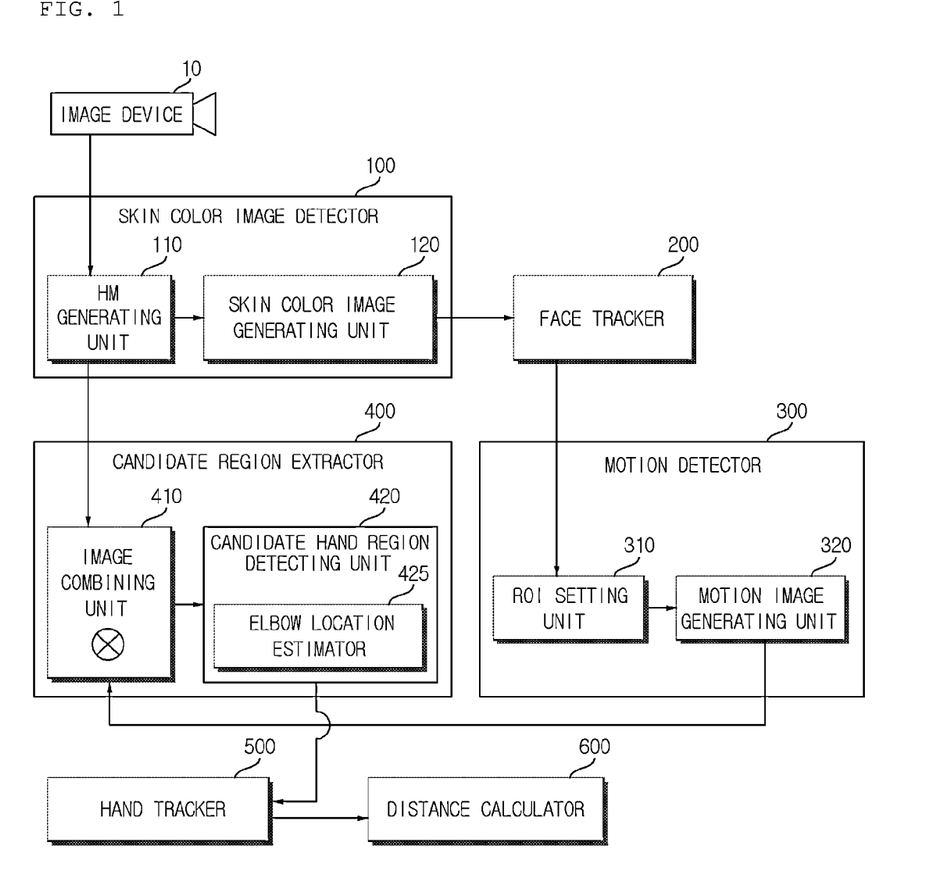
FIG. 1 is a block diagram illustrating a configuration of an apparatus for tracking a hand according to an exemplary embodiment of the present invention.

FIG. 1 is a block diagram illustrating a configuration of an apparatus for tracking a hand according to an exemplary embodiment of the present invention.

The apparatus 1 for tracking a hand according to an exemplary embodiment of the present invention includes a skin color image detector 100, a face tracker 200, a motion detector 300, a candidate region extractor 400, a hand tracker 500, and a distance calculator 600. Here, the tracking of the hand means tracking an image with respect to a region in which a human hand is located from an image input from an image device.

The skin color image detector 100 detects a skin color image from an image input from an image device 10 using a predetermined skin color of a user (S100). The using of the predetermined skin color of the user may use a color skin of a face with respect to a face location initially input with respect to an initial image. The skin color region may be a region having a similar image based on a color with respect to a location of a face in an input image. The skin color image detector 100 includes a histogram model generating unit 110 and a skin color image generating unit 120. The histogram model generating unit 110 generates a histogram model (S110). The histogram model diagrammatizes distribution of information including colors, brightness, or saturation of pixels included in an image. The histogram model of the present exemplary embodiment may be a color histogram model indicating distribution of colors according to RGB values of pixels included in the image.

The skin color image generating unit 120 applies a histogram back-projection method based on the histogram model generated by the histogram model generating unit 110 to generate the skin color image (S120).

The histogram back-projection method is a method which divides objects in an image and finds out a location of an object to be tracked. A region of interest (ROI) is displayed with a bright gray image through histogram back-projection. Values of pixels included in an image through histogram back-projection are expressed by the following equation 1. In the equation 1, an M(c) indicates a ratio of a color value c in an ROI of a histogram, and an I(c) means a ratio of a color value c in an entire region of the histogram. A BPI(c) indicates a histogram back-projection value with respect to the color value c. The BPI(c) is calculated for each pixel, a region of interest on a back-projection image is displayed with a bright color, and the other region of the back-projection image is displayed with a dark color.

$$BPI(c) = \frac{M(c)}{I(c)} \times 255 \qquad [\text{Equation 1}]$$

Figure 2A:
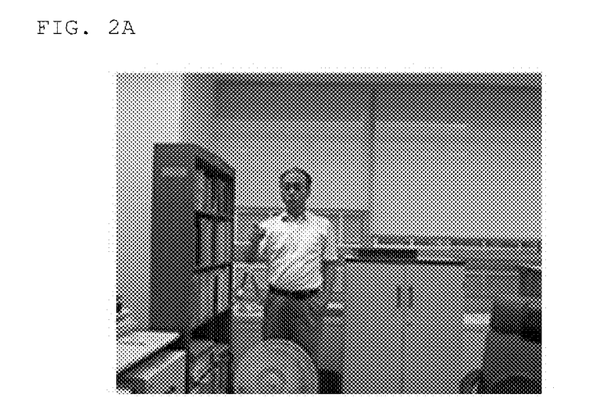
FIGS. 2A and 2B illustrate exemplary skin color images detected by a skin color image detector of an apparatus for tracking a hand according to an exemplary embodiment of the present invention.
Figure 2B:
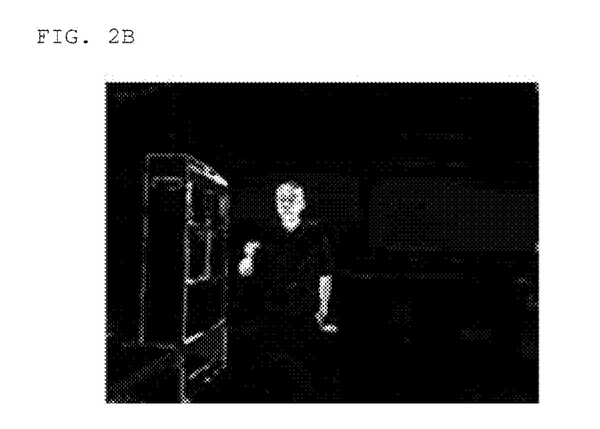

In the skin color image generated by the histogram back-projection, a region having a color similar to a skin color of a user is displayed with a white color on the back-projection image, and remaining regions are displayed with a dark color. A skin color image generated according to the present exemplary embodiment is expressed as illustrated in FIGS. 2A and 2B. Referring to FIGS. 2A and 2B, a user may view a skin color image in FIG. 2B, which includes a region having a color similar to a skin color displayed with a bright color from an input image in FIG. 2A, and remaining regions displayed with a dark color.

The face tracker 200 tracks a face using the skin color image detected by the skin color image detector 100 (S200). The face tracker 100 may track a location of the face with respect to the skin color image generated by the skin color image detector 100 using a mean shift tracking method.

The mean shift tracking method is a method for tracking a tracking target object by repeatedly detecting a slope value of probability distribution to detect an intermediate value of the greatest probability distribution which a region of a tracking target object has so as to find out an intermediate value of the probability distribution from a frame using a probability map. The mean shift tracking method is an efficient tracking method to detect a locally destination point. The destination point is tracked by a hill climbing method. Specifically, the destination point is gradually tracked while continuously reducing a difference between a detected point and the destination point. In the present exemplary embodiment, if a weighted mean with respect to a given candidate region is calculated, a center point is moved to a location with respect to a new weighted mean. Such a procedure is repeatedly performed until a different between an old point and a new point becomes less than a preset threshold.

The motion detector 300 sets an ROI using location information about the face tracked by the face tracker 200, and detects a motion image from the set ROI (S300).

Figure 3:
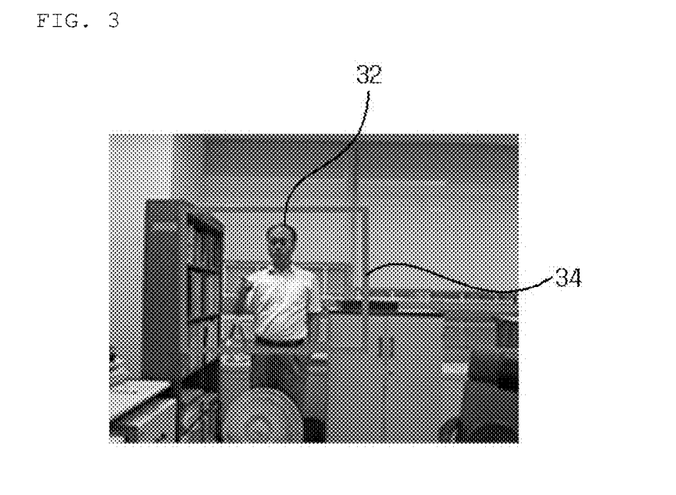
FIG. 3 is an exemplary image illustrating a region of interest set by a region of interest setting unit of an apparatus for tracking a hand according to an exemplary embodiment of the present invention.

The motion detector 300 includes an ROI setting unit 310 and a motion image detecting unit 320. The ROI setting unit 310 sets an ROI using the location of the face tracked by the face tracker 200 (S310). The ROI setting unit 310 may set a reachable region by a hand based on a location of a face of the user as the ROI. The ROI setting unit 310 may set a region which the hand is able to reach based on the location of a face of the user as the ROI. The reachable region by a hand is a region in which a hand in a human body structure may be located based on a location in an input image of the face tracked by the face tracker 200. Referring to FIG. 3, it will be understood that an ROI 34 is set based on a location 32 of a face.

The motion image generating unit 320 detects a motion image using a frame difference between input images with respect to the ROI set by the ROI setting unit 300 (S320). The motion image generating unit 320 may detect the motion image using motion history information generated by accumulating a frame difference between continuously input images N times. In the present exemplary embodiment, the frame difference between the images may be variation when a current input image is compared with a previously input image for each pixel in the continuously input images.

A difference between two continuously input image information may be variation between two image information measured using a frame difference or optical flow. In the present exemplary embodiment, a comparison value may be calculated using the frame difference for each pixel. A following equation 2 is an equation for calculating the comparison value $d_t(x)$ between unit images with respect to an image unit x on the assumption that characteristic in each image unit of input image information is achieved in n dimensions and a t-th image is input. Here, the x indicates an index of the image unit.

$$d_t(x) = \sum_{i=1}^{n} |f_t(x, i) - f_{t-1}(x, i)| \qquad [\text{Equation 2}]$$

where $f_t(x,i)$ and $f_{t-1}(x,i)$ note i-th characteristics of image units x of a t-th image and a (t−1)-th image, respectively. In the present exemplary embodiment, characteristics of the compared images include a black/white or color value, a hue-saturation-brightness (HSB) value, and a color histogram value.

Frame differences between continuously input images may be accumulated N times by logically ORing the frame differences of images. In the present exemplary embodiment, in a procedure of accumulating the differences of images by the logical ORing operation, the motion detector 300 determines that movement occurs when a difference between the images is equal to or greater than a preset threshold. Differences between the images are accumulated and summed by the logical ORing operation while the images are input N times to generate the motion image. In this case, the accumulated and generated motion image includes all motions existing in an ROI set by an ROI setting unit 310 while the image is input N times.

Figure 4:
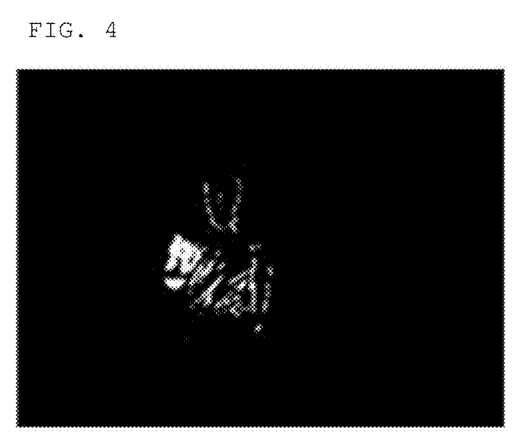
FIG. 4 illustrates an exemplary motion image detected by a motion detector of an apparatus for tracking a hand according to an exemplary embodiment of the present invention.

The motion history information may be an image obtained by accumulating differences between the foregoing images N times. In the present exemplary embodiment, the motion image detected using the motion history information is shown in FIG. 4. If moving result values are accumulated and summed by ORing operation, parts in which movement is detected and parts in which the movement is not detected are distinctly displayed from each other. In the motion history according to the present exemplary embodiment, bright parts mean parts in which the movement may be detected and dark parts mean parts determined in which the movement is not detected.

The candidate region extractor 400 extracts a candidate region with respect to a hand of a user using the skin color image detected by the skin color image detector 100 and the motion image detected by the motion detector 300 (S400). In the present exemplary embodiment, the candidate region extractor 400 includes an image combining unit 410 and a candidate hand region detecting unit 420.

Figure 5:
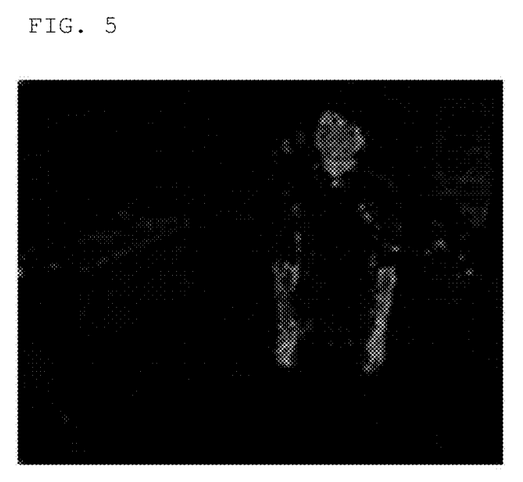
FIG. 5 illustrates an exemplary image combined by an image combining unit of an apparatus for tracking a hand according to an exemplary embodiment of the present invention.

The image combining unit 410 combines the skin color image generated by the skin color image detector 100 and motion images detected by the motion detector 300 to generate a common region between the skin color image and the motion image (S410). The image combining unit 410 obtains the common region between the skin color image and the motion image using AND operation when the skin color image and the motion image are input thereto. In the present exemplary embodiment, the skin color image combined by the image combining unit 410 may be an image of a given hand region extracted from the input image using a skin color of the face by the skin color image detector 100. The common region between the skin color image and the motion image generated using the AND operation may be a region corresponding to a skin color image with respect to the hand region in the accumulated and generated motion image. In more detail, the common region is an extracted and generated image in which an image generated by extracting only a region in which a hand is moved from regions determined in which movement occurs in the ROI set by the ROI setting unit 310. FIG. 5 is an exemplary image illustrating the common region generated by logically ANDing the skin color image and the motion image.

The candidate hand region detecting unit 420 applies a first preset algorithm to the common region generated by the image combining unit 410 to detect a candidate hand region (S420). The candidate hand region detecting unit 420 further includes an elbow location estimator 425.

The elbow location estimator 425 may estimate a location of an elbow using a ratio determined in consideration of location and size information of the face tracked by the face tracker 200, and applies a first preset algorithm based on the estimated location of the elbow to obtain the candidate hand region.

To estimate the location of the elbow using the ratio determined in consideration of the location and size information of the face according to the present exemplary embodiment may be expressed by a following equation 3 using the location and size information of the face as follows.

In the following equation 3, $x_{face\ left}$ is a left location of an x axis of the face, $W_{face}$ is a width of the face, $y_{face\ bottom}$ is a lower location on a y axis of the face, $H_{face}$ is a variable with respect to a height of the face, and K is a parameter for searching a final location of the elbow. $X_{elbow}$ and $y_{elbow}$ are x and y coordinates of the elbow, respectively.

$$x_{elbow} = x_{face\ left} - W_{face}$$
$$y_{elbow} = y_{face\ bottom} - H_{face} * K$$
$$K = \frac{11}{5}$$

[Equation 3]

Figure 6:
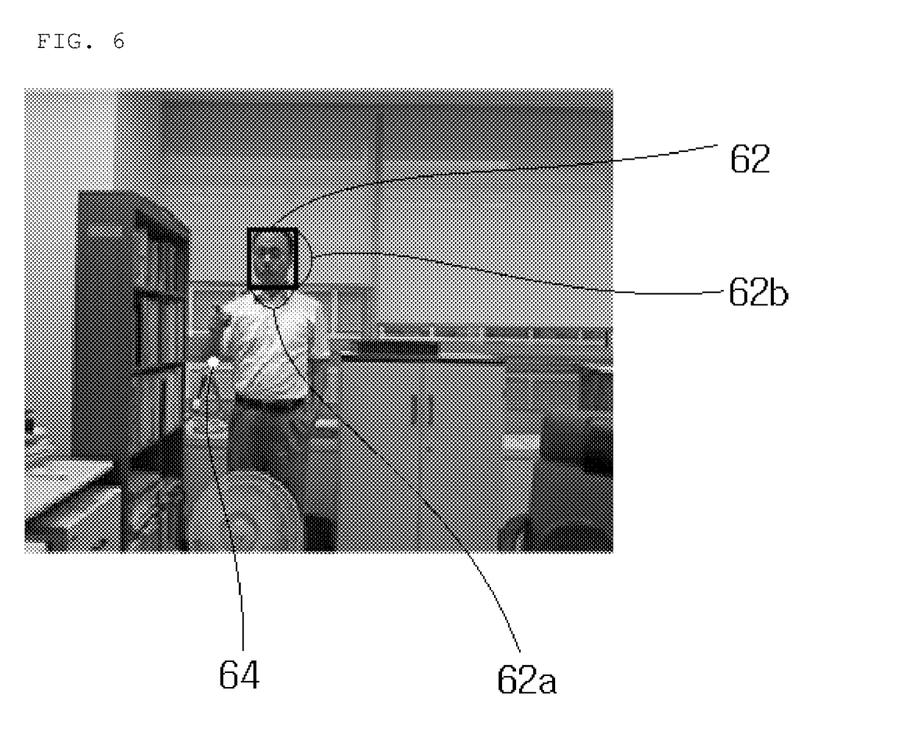
FIG. 6 is an exemplary image illustrating an example of estimating a location of an elbow by an elbow location estimating unit of an apparatus for tracking a hand according to an exemplary embodiment of the present invention.

Referring to FIG. 6, in the present exemplary embodiment that a point setting a location moved from a left side of the face 62 by a width 62a of the face to x, and setting a location moved from a lower side of the face by (a height 62b of the face×K) is estimated as a location 64 of an elbow.

In the present exemplary embodiment, the first preset algorithm may be a method for performing a distortion filter based on a location of an elbow to find out a more exact candidate hand region. This method is a method for distorting a hand region extracting image to be used as an input of a mean shift tracking method. Since the hand region is farthermost spaced apart from an elbow having a skin color, it is preferably that a distortion filter for setting the lowest value to a location of an elbow and a higher value to a location distant from the elbow is applied to easily find out a hand region.

Figure 7A:
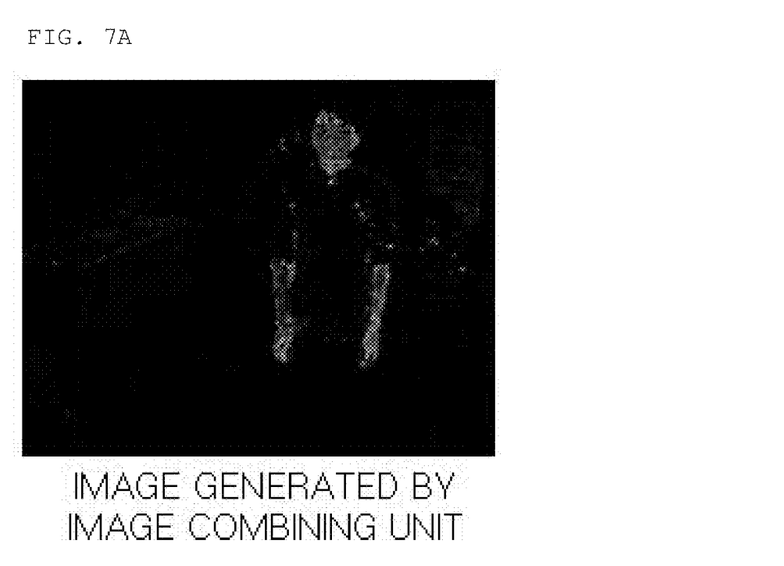
FIG. 7A, 7B, 7C are exemplary images illustrating an example of applying a distortion filter to detect a hand region by a candidate hand region detecting unit according to an exemplary embodiment of the present invention.
Figure 7B:
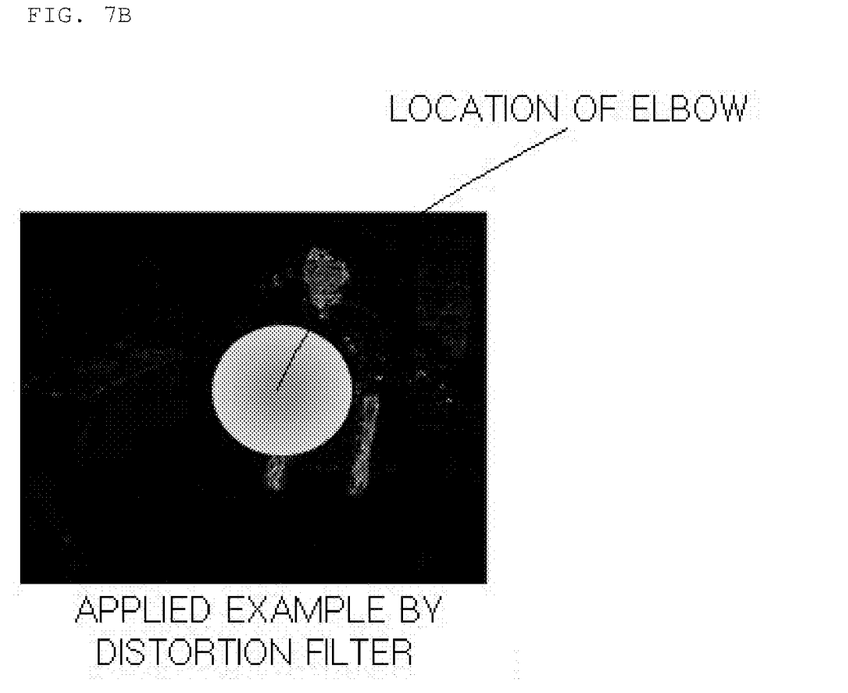
Figure 7C:
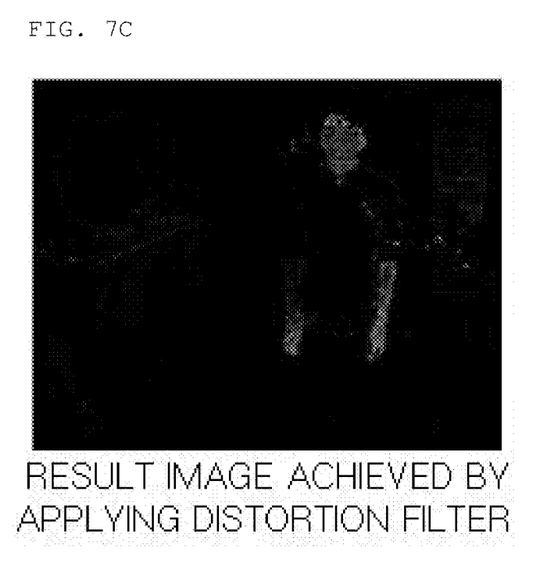

Referring to FIG. 7A a distortion filter is applied to an image (FIG. 7A) generated by the image combining unit 410 based on the location of the elbow. In the present exemplary embodiment, to apply the distortion filter, a value with respect to an extracted image in a deep part is set similar to 0. Referring to FIG. 7B both of hands and arms are displayed bright in a hand region extracting image before applying the distortion filter. However, referring to FIG. 7C, in a result of applying a distortion filter centering around a location of an elbow, only a hand region distant from the elbow is displayed bright.

The hand tracker 500 tracks a location of the hand from the candidate region extracted by the candidate region extractor 400 to find out a final location of the hand (S500). The hand tracker 500 may apply the mean shift tracking method to a candidate region extracted by the candidate region extractor 400 to find out the final location of the hand. In the mean shift tracking method according to the present exemplary embodiment, when a weighted mean with respect to a given candidate region as illustrated above is calculated, a center point is moved to a location with respect to a new weighted point. Such a procedure is preferably repeated until a difference between an old point and a new point is less than a preset threshold to find out the final location of the hand.

The distance calculator 600 applies a second preset algorithm to the location information of the hand extracted by the hand extractor 500 to calculate actual distance information of the hand (S600). It is preferred that the distance calculator 600 applies the second algorithm to a location of a first hand tracked from the first image input from a first image device and location information of a second hand tracked from the second image input from a second image device to calculate the actual distance information of the hand. In this case, each of the location of the first hand and the location of the second hand may be a location of the hand tracked by the hand tracker 500. The second algorithm may be a distance calculating algorithm according to triangulation. In the distance calculating algorithm according to the triangulation, assuming that a focal length of an image device with respect to an object photographed by two image devices is f, a difference of spaced degrees of an object from the images photographed by the two image devices is disparity (d), and a distance between the image devices is base offset (b), a distance D between the object and the image device is expressed by a following equation 4.

$$D = b\frac{f}{d}$$ [Equation 4]

In the present exemplary embodiment, the d is a distance calculated using final location information x and y of the hand tracked by the hand tracker 500, location information of a first hand, and location information of a second hand, and the D is an actual distance between the image device and a hand of a user.

Figure 8:
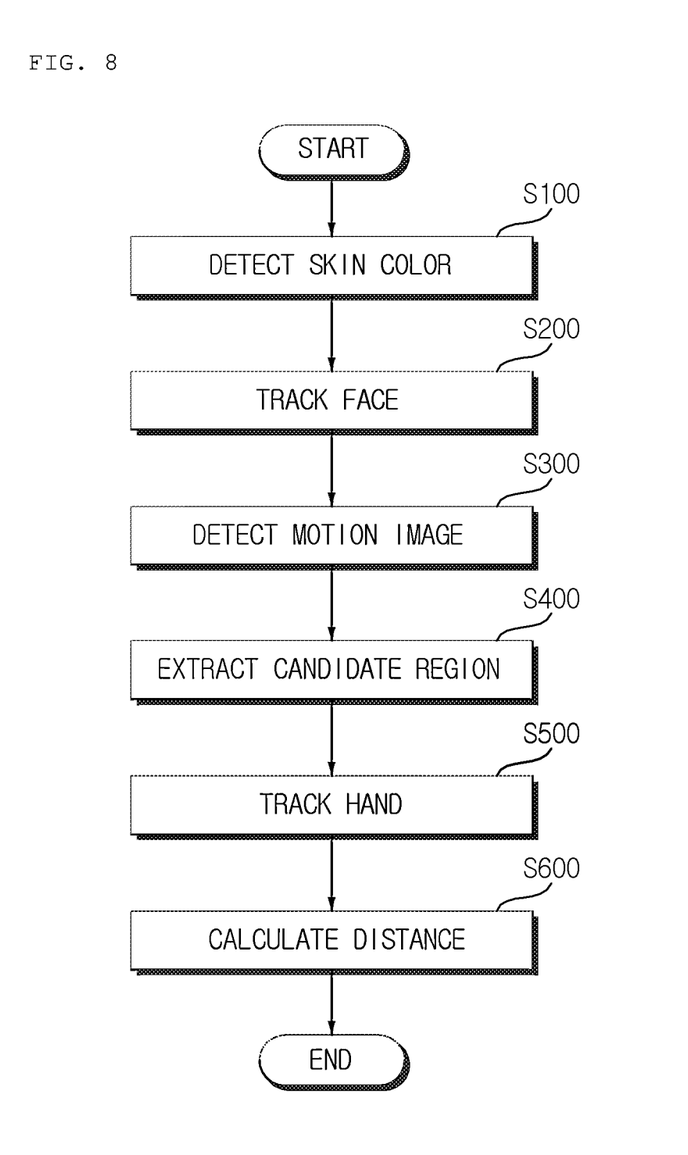
FIG. 8 is a flowchart illustrating a method for tracking a hand according to an exemplary embodiment of the present invention.

FIG. 8 is a flowchart illustrating a method for tracking a hand according to an exemplary embodiment of the present invention. The method for tracking a hand according to the present exemplary embodiment includes following steps which are sequentially processed by the apparatus for tracking a hand.

The method for tracking a hand according to the present exemplary embodiment includes a skin color image detecting step S100, a face tracking step S200, a motion image detecting step S300, a candidate region extracting step S400, a hand tracking step S500, and a distance calculating step S600.

The skin color image detecting step S100 detects the skin color region from the image input from an image device using a preset skin color of a user.

Figure 9:
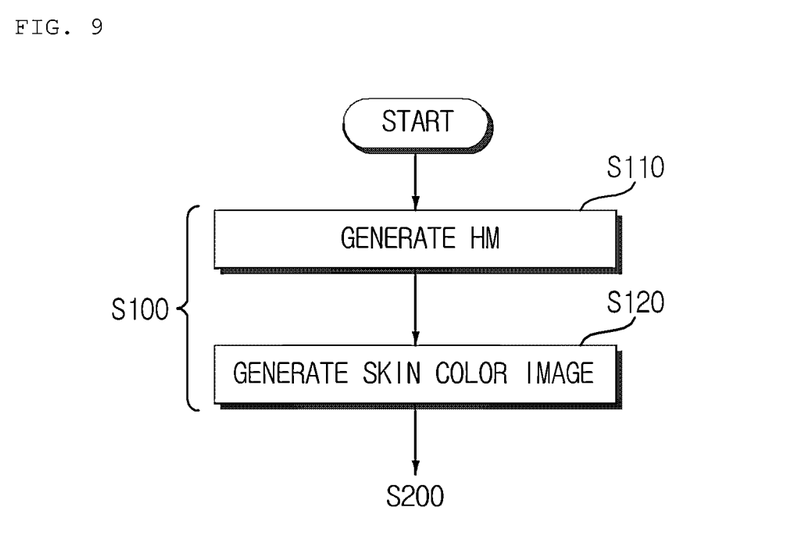
FIG. 9 is a detailed flowchart illustrating a skin color detecting step of a method for tracking a hand according to an exemplary embodiment of the present invention.

Referring to FIG. 9, the skin color image detecting step S100 includes a step S110 of generating a histogram model and a step S120 of generating a skin color image. The step S110 of generating a histogram model generates a color histogram model (S110). The step S120 of generating a skin color image applies a histogram back-projection method based on the histogram model generated by a histogram model generating unit 110 to generate the skin color image.

The face tracking step S200 tracks the face using the skin color image detected in the skin color image detecting step S100 (S200).

The motion image detecting step S300 sets a region of interest (ROI) using location information with respect to the face tracked in the step face tracking step S200, and detects a motion image in the set ROI.

Figure 10:
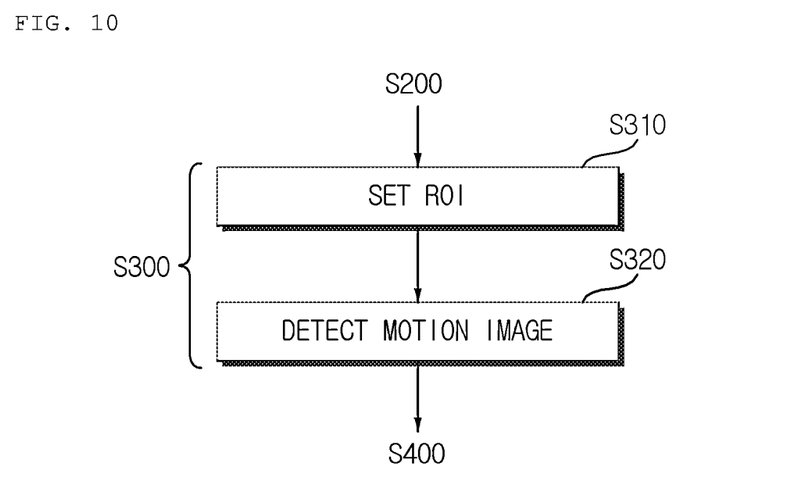
FIG. 10 is a detailed flowchart illustrating a motion image detecting step of a method for tracking a hand according to an exemplary embodiment of the present invention.

Referring to FIG. 10, the motion image detecting step S300 includes a step S310 of setting the ROI and a step S320 of detecting a motion image. The step S310 of setting the ROI sets an ROI using a location of the face tracked in the face tracking step S200 (S310).

The step S320 of detecting the motion image detects the moving region using a frame difference between input images with respect to the ROI set in the step S310 of the setting the ROI (S320).

Figure 11:
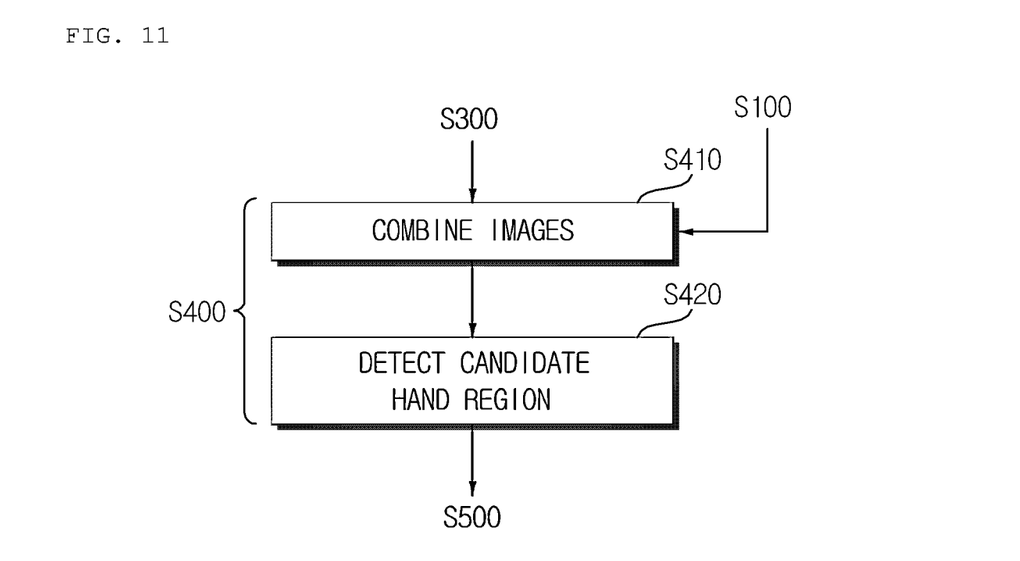
FIG. 11 is a detailed flowchart illustrating a candidate region extracting step of a method for tracking a hand according to an exemplary embodiment of the present invention.

The candidate region extracting step S400 extracts a candidate region with respect to a hand of a user using the skin color image detected in the skin color image detecting step S100 and the motion image detected in the motion image detecting step S300 (S400). Referring to FIG. 11, the candidate region extracting step S400 according to the present exemplary embodiment includes a step S410 of combining images and a step S420 of detecting a candidate hand region.

The step S410 of combining image generates a common region between the skin color images generated in the skin color image detecting step S100 and the motion image detected in the motion image detecting step S300 (S410).

The step S420 of detecting a candidate hand region applies the first preset algorithm to the common region generated by the image combining unit 410 to detect the candidate hand region (S420). The step S420 of detecting a candidate hand region further includes a step S425 of estimating a location of an elbow.

The step S425 of estimating the location of the elbow may estimate a location of the elbow using a ratio determined in consideration of location and size information of the face tracked in the face tracking step S200, and applies the first preset algorithm based on the estimated location of the elbow to obtain a candidate hand region.

The hand tracking step S500 tracks a location of the hand from the candidate region extracted by the candidate region tracking step S400 to find out a final location of the hand (S500).

The distance calculating step S600 applies the second preset algorithm to the location information of the hand extracted in the hand tracking step S500 to calculate actual distance information of the hand.

In the meantime, the method for tracking the hand according to an exemplary embodiment of the present invention may be implemented in a computer readable recording medium as codes which may be read by a computer. The computer readable recording medium includes any types of recording devices storing data which may be read by a computer system.

There are a read only memory (ROM), a random access memory (RAM), compact disc (CD)-ROM, a magnetic tape, a floppy disc, an optical data storage device, and the like as examples of the computer readable recording medium. The computer readable recording medium is distributed in a computer system connected over a network and the computer readable code may be stored and executed in a distribution scheme. Functional programs, codes, and code segments for implementing the present invention may be easily induced by programmers of ordinary skill in the art to which the invention pertains.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for tracking a hand, the apparatus comprising: a non-transitory computer-readable storage medium storing instructions, and a processor for executing the instructions, the instructions causing the processor to:
   detect a skin color image from an image input from an image device using a predetermined skin color of a user;
   track a face using the skin color image;
   set a region of interest (ROI) using location information of the face;
   detect a motion image from the ROI;
   extract a candidate region with respect to a hand of the user using the skin color image and the motion image; and
   track a location of the hand in the extracted candidate region to find out the location of the hand,
   wherein the ROI is a reachable region by the hand of the user based on the location information of the face.

2. The apparatus of claim 1, wherein the instructions causing the processor to:
   generate a histogram model with respect to the image input from the image device using the skin color of the face by receiving an initial face location; and
   generate the skin color image by applying a histogram back-projection method based on the histogram model.

3. The apparatus of claim 1, wherein the instructions causing the processor to:
   track the location of the face with respect to the skin color image using a mean shift tracking method when tracking the face.

4. The apparatus of claim 1, wherein the instructions causing the processor to:
   detect the motion image using a frame difference between images input with respect to the ROI.

5. The apparatus of claim 4, wherein the instructions causing the processor to:
   detect the motion image using motion history information generated by accumulating a frame difference between a current image and a previous image continuously input N times.

6. The apparatus of claim 5, wherein the differences between the continuously input images are accumulated N times by logically ORing the frame differences of the images.

7. The apparatus of claim 1, wherein the instructions causing the processor to:
   generate a common region between the skin color image and the motion images; and
   obtain a candidate hand region by applying a first preset algorithm to the common region.

8. The apparatus of claim 7, wherein the instructions causing the processor to:
   estimate a location of an elbow using a ratio determined in consideration of location and size of the face tracked, and
   obtain the candidate hand region by applying the first preset algorithm based on the estimated location of the elbow.

9. The apparatus of claim 1, wherein the instructions causing the processor to:
   find out the final location of the hand by applying a mean shift tracking method to the candidate region.

10. The apparatus of claim 1, wherein the instructions further causing the processor to:
    calculate actual distance information of the hand by applying a second preset algorithm to the location information of the hand.

11. The apparatus of claim 10, wherein the instructions causing the processor to:
    calculate the actual distance information of the hand by applying the second preset algorithm to a location of a first hand tracked from the first image input from a first image device and a location of a second hand tracked from the second image input from a second image device, and
    wherein, each of the location of the first hand and the location of the second hand is a location of the tracked hand.

12. A method for tracking a hand, the method comprising:
    detecting a skin color image from an image input from an image device using a predetermined skin color of a user;
    tracking a face using the skin color image detected in the detecting of the skin color image;
    setting a region of interest (ROI) using location information of the face tracked in the tracking of the face;
    detecting a motion image from the ROI;
    extracting a candidate region with respect to a hand of the user using the skin color image detected in the detecting of the skin color image and the motion image detected in the detecting of the motion image; and
    tracking a location of the hand in a candidate region extracted in the extracting of the candidate region to find out the location of the hand,
    wherein the ROI is a reachable region by the hand of the user based on the location information of the face.

13. The method of claim 12, wherein the detecting of a skin color image includes:
    generating a histogram model with respect to the image input from the image device using the skin color of the face by receiving an initial face location; and
    generating the skin color image by applying a histogram back-projection method based on the histogram model generated in the generating of the histogram model.

14. The method of claim 12, wherein the detecting of the motion image includes:
    detecting the motion image using a frame difference between images input with respect to the ROI.

15. The method of claim 12, wherein the extracting of the candidate region includes:
    generating a common region between the skin color image generated in the detecting of the skin color image and the motion image detected in the detecting of the motion image; and
    obtaining a candidate hand region by applying a first preset algorithm to the common region generated in the generating of the common region.

16. The method of claim 15, wherein the detecting of the candidate hand region includes:
    estimating a location of an elbow using a ratio determined in consideration of location and size of the face tracked in the tracking of the face, and
    obtaining the candidate hand region by applying the first preset algorithm based on the estimated location of the elbow.

17. The method of claim 12, further comprising:
    calculating actual distance information of the hand by applying a second preset algorithm to the location information of the hand extracted in the tracking of the location of the hand.

18. The method of claim 17, wherein the calculating the actual distance information of the hand includes:
    calculating the actual distance information of the hand by applying the second preset algorithm to a location of a first hand tracked from the first image input from a first image device and a location of a second hand tracked from the second image input from a second image device, and wherein, each of the location of the first hand and the location of the second hand is a location of the hand tracked in the tracking of the location of the hand.

* * * * *